(12) United States Patent
Bakke

(10) Patent No.: US 7,011,344 B1
(45) Date of Patent: Mar. 14, 2006

(54) CONNECTOR AND METHOD OF USE OF THE CONNECTOR

(75) Inventor: Stig Bakke, Álgárd (NO)

(73) Assignee: Bakke Technology AS, Algard (NO)

( * ) Notice: Subject to any disclaimer, the term of this patent is extended or adjusted under 35 U.S.C. 154(b) by 446 days.

(21) Appl. No.: 10/031,207

(22) PCT Filed: Jun. 22, 2000

(86) PCT No.: PCT/NO00/00214

§ 371 (c)(1),
(2), (4) Date: Jul. 2, 2002

(87) PCT Pub. No.: WO01/09543

PCT Pub. Date: Feb. 8, 2001

(30) Foreign Application Priority Data

Jul. 12, 1999 (NO) .......................................... 19993437

(51) Int. Cl.
*F16L 21/02* (2006.01)

(52) U.S. Cl. .................... 285/374; 285/354; 285/339
(58) Field of Classification Search ................ 285/255, 285/339, 342, 343, 382.7, 354, 374, 333, 285/334, 323
See application file for complete search history.

(56) References Cited

U.S. PATENT DOCUMENTS

| | | | | |
|---|---|---|---|---|
| 1,823,061 A | * | 9/1931 | Pearson ........................ | 277/607 |
| 2,350,017 A | | 5/1944 | Davis | |
| 2,536,354 A | * | 1/1951 | Cowles ..................... | 285/334.5 |
| 3,248,135 A | | 4/1966 | Meripol | |
| 3,471,181 A | | 10/1969 | Fuentes | |
| 3,815,940 A | * | 6/1974 | Luckenbill .................. | 285/105 |
| 3,915,478 A | * | 10/1975 | Al et al. ........................ | 285/45 |
| 3,972,547 A | | 8/1976 | Itoya | |
| 3,980,325 A | * | 9/1976 | Robertson ..................... | 285/249 |
| 3,986,730 A | * | 10/1976 | Martelli et al. ................ | 285/23 |
| 4,138,147 A | * | 2/1979 | Manchester et al. ...... | 285/145.1 |
| 4,330,143 A | * | 5/1982 | Reneau ......................... | 285/322 |
| 5,156,206 A | * | 10/1992 | Cox ......................... | 166/242.2 |
| 6,378,915 B1 | * | 4/2002 | Katz ........................... | 285/342 |

FOREIGN PATENT DOCUMENTS

| | | |
|---|---|---|
| GB | 2 257 180 | 6/1993 |
| GB | 2 298 467 | 4/1996 |

* cited by examiner

Primary Examiner—James M. Hewitt
(74) Attorney, Agent, or Firm—Moser, Patterson & Sheridan, L.L.P.

(57) ABSTRACT

A connector for connection of a pipe end portion of coiled tubing adapted for connecting a piece of downhole equipment. The connector is formed by three separate parts that can be screwed together two and two, of which a radially inner shrinkable adapter sleeve compressively surrounded by an elongate outer adapter and connector sleeve ensures the securing of the end portion of the coiled tubing, whereas a freely projecting, internally threaded end portion of the outer sleeve ensures the connection to the remaining part of the connector in the screwing together. The connector, besides exhibiting improved tensile, flexural and compressive strength properties, is also well suited to absorb torques applied. The inner shrinkable adapter sleeve, which has an external jacket surface of an axially conical extent, is provided with external threads, complementarily matched by the internal threads of the outer adapter and connector sleeve, which are formed in the bore-defining inner circumferential surface, which has a conical extent in the axial direction, its conicity complementarily corresponding to the externally conical extent of the inner adapter sleeve.

18 Claims, 3 Drawing Sheets

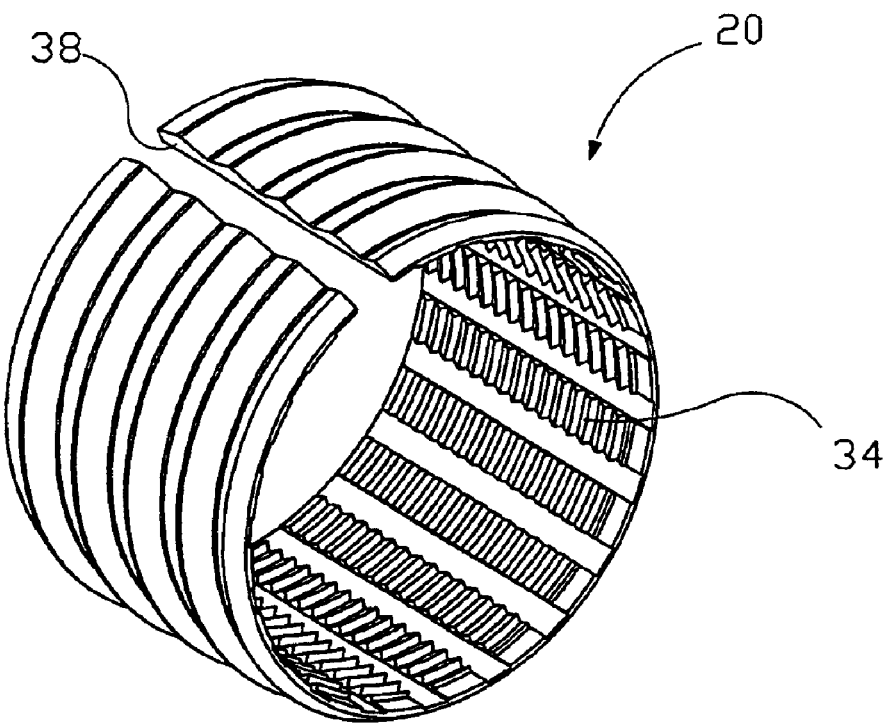
FIG. 3
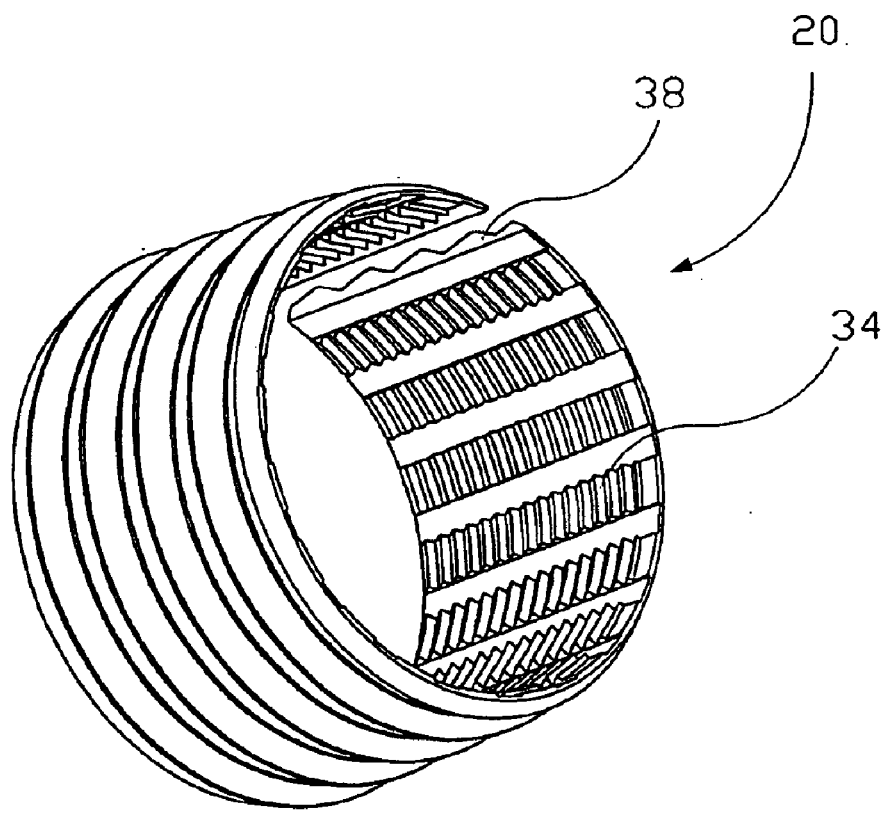

CONNECTOR AND METHOD OF USE OF THE CONNECTOR

RELATED APPLICATIONS

This is the U.S. National phase under 35 U.S.C. §371 of International Application PCT/NO00/00214, filed Jun. 22, 2000, and claims the benefit of the Norwegian application 19993437 filed Jul. 12, 1999.

BACKGROUND OF THE INVENTION

1. Field of the Invention

This invention relates to a connector for the connection of the outer end portion of a pipe, a pipe line, a pipe string or coiled tubing, the connector moreover being formed for the connection of at least one piece of downhole equipment, a downhole tool etc., e.g. a drill bit, a drive engine for same, a measuring instrument etc. to carry out drilling, downhole operations or measuring, which connector comprises connectable parts for the connecting and securing of the pipe end portion, including an inner adapter sleeve and an outer adapter and connector sleeve, which can be connected to the connecting element of an end piece/connecting piece.

Also, the invention relates to a method of establishing the connection and securing the pipe end portion to the connector.

2. Description of the Related Art

For connecting pieces for coiled tubing it is important, for space reasons, to allow the external diameter to be kept as small as possible, and it is also important that the connecting piece can stand high tensile loads, high pressure loads and the effect of high torques.

Existing connectors of this kind normally comprise an adapter sleeve with an externally conical smooth surface. Such an adapter sleeve with a smooth surface will cause a great expansive force on an external adapter and connector sleeve surrounding the adapter sleeve, when the connector is subjected to tensile load. This disadvantageous condition is normally compensated for by increasing the external diameter of the connector, which is also unfortunate and disadvantageous.

A smooth conical adapter sleeve bearing against the surrounding end portion of coiled tubing, can only absorb a highly limited torque.

Existing connectors are generally locked by set screws meant to have the task of absorbing torques. This is a particularly unfortunate construction as such screws are generally unsuitable for such a task, and may, at worst, come loose through vibrations, and may fall out, after which the loose set screws may cause damage to the well and downhole equipment.

Therefore, there is a need for a connector and method of connection to remedy or reduce, to a substantial degree, by simple means the drawbacks, disadvantages and limitations of use of conventional connectors of this kind and of other known connectors of similar types, and thus provide a connector for the purposes in question, in which the external diameter is kept as small as possible, and which exhibits, with dimensions corresponding to those of known connectors, a higher tensile end compressive strength and greater resistance towards external torques applied thereto.

SUMMARY

The aforementioned needs are satisfied by a connector for connecting the end portion of a pipe, a pipeline, a pipe string or coiled tubing. The connector is formed or provided with at least one connecting device for equipment/tools, and comprises parts that can be screwed together and have aligned bores for the accommodation of said pipe end portion which is secured in the connector in the screwed-together condition of the parts. The connector further comprises a radially inner transverally shrinkable adapter sleeve which is to bear in the connected position at its inner circumferential surface in a clamping manner against the outer jacket surface of the pipe end portion. The inner adapter sleeve has an external conically extending threaded jacket surface that is formed in a view of cooperating with a surrounding outer adapter and connector sleeve with an internal conically extending threaded circumferential surface. The outer adapter and connector sleeve is formed to cooperate with a threaded jacket portion of a socket-like connecting element formed on an end piece having the said connecting device.

As opposed to the state of the art, the adapter sleeve of the connector according to the invention has an external conical shape and is provided with external threads (normally left-hand threads), and, on the internal cylindrical surface opposite the coiled tubing, with friction-creating ribs, preferably in the form of (right-hand)threads.

The adapter sleeve is split and can be shrunk around the coiled tubing by the outer adapter and connector sleeve formed with a conical threaded inner surface complementarily corresponding to the conicity of the adapter sleeve. The sleeve wall of the outer adapter and connector sleeve is tapered gradually in the direction of the end piece incorporated in the connector, and can be screwed to the socket-like connecting element of the said end piece, said connecting element having an externally conical sleeve wall tapering towards its free end, complementarily corresponding to the conicity of the outer sleeve, with external threads.

The socket-like connecting element of the end piece normally has a smooth cylindrical bore of a diameter selected to slide over the outer diameter of the coiled tubing.

The diameter of the internally threaded bore of the outer adapter and connector sleeve exceeds the diameter of the coiled tubing, other than at the end portion positioned at maximal distance from said end piece, wherein the outer adapter and connector sleeve is formed with an annular inward flange of a comparatively large axial extent and of a diameter selected to fit the outer diameter of the coiled tubing.

In this annular flange end portion is formed a circumferential groove which is open in the radially inward direction, and which accommodates a seal in the form of an O-ring. Another annular seal in the form of an O-ring is inserted in an internal circumferential groove formed in the socket-like connecting element in a position closer to the end piece than the position of an annular shoulder portion forming a stop and abutment surface for the end surface of the outer sleeve in the screwed together condition.

Due to the mutually cooperating, complementarily conical surfaces and sleeve walls tapering in opposite directions, the screwed-together outer elements, an outer adapter and connector sleeve and the socket-like connecting piece of the end piece, will together exhibit a minimal external diameter.

At the internal "ribs" of the inner, externally conical adapter sleeve, preferably in the form of right-hand threads, said right-hand threads will resist displacement of the inner sleeve and "bite" into the surface of the coiled tubing.

The externally conical adapter sleeve with external left-hand threads, incorporated in the connector according to the invention, will be capable of adopting torques, and the torque applied will tighten the inner adapter sleeve even more firmly to the external wall surface of the coiled tubing.

By high tensile loads the expansive forces will not be correspondingly high as when the inner adapter sleeve from known technique is externally smooth. By compressive forces the inner shrinkable adapter sleeve will tighten on the surrounding portion of the coiled tubing.

In the connecting of the coiled tubing, including securing thereof, and in the joining/screwing together of the different parts of the connector in the establishing of the connection, the procedure is preferably as follows:

The outer adapter and connector sleeve is passed over the end portion of the coiled tubing, so that its inward annular flange with the O-ring is the farthest from the end of the coiled tubing, so that the tapering of the sleeve wall towards the free end thereof, is pointing in the same direction as the free end portion of the coiled tubing.

As to the positioning of the outer adapter and connector sleeve on the coiled tubing, it is ensured that its free end, where the wall thickness is at its smallest, will be located at a relatively large distance from the end of the coiled tubing. Then the inner split shrinkable externally conical adapter sleeve with external threads is passed over the coiled tubing. The internal right-hand threads of the inner adapter sleeve act as friction-creating "ribs", and resist gliding of the inner adapter sleeve through rotation/displacement externally on the coiled tubing (also in the condition of use, when exposed to external forces).

Then the outer adapter and connector sleeve is screwed, by its internally conical threaded portion, along the externally conical threaded surface of the internal adapter sleeve, complementarily corresponding the conicity of the outer sleeve, and - as the inner diameter of the threads of the outer sleeve decreases - the inner shrinkable sleeve is compressed transversally thereby transferring compressive forces from the outer sleeve to the coiled tubing, which is thereby secured. When an optimal degree of securing has been achieved, the outer sleeve has, from its free end, a free (not in threaded engagement with the inner adapter sleeve) internally conical threaded end portion, which—on adjustment, according to experience, of the position of the inner adapter sleeve relative to the end of the coiled tubing in the position of use—shall have a larger axial longitudinal extent than the depth of entering (depth of screwing) of the socket-like connecting element of the end piece, extending over said depth of entering, conically narrowing towards its free end.

In this position the socket-like connecting element of the end piece is screwed into said free internally threaded connecting portion of the outer sleeve, up to an annular movement-limiting abutment shoulder defining the socket-like connecting element innermost by the end piece, and determining its depth of entering into the outer sleeve.

Thereby the connection is established, and the end piece may be connected to a piece of downhole equipment, for example a tool, a drill bit, an engine, an instrument, a measuring device etc. whose kind is not an object of the present invention.

These and other objects and advantages of the invention will become more fully apparent from the following description of a non-limiting embodiment taken in conjunction with the accompanying drawings.

BRIEF DESCRIPTION OF THE DRAWINGS

FIG. 3 shows a perspective view of said inner adapter sleeve is which is split longitudinally and can be shrunk transversally.

DETAILED DESCRIPTION OF THE PREFERRED EMBODIMENT

Figure 1:
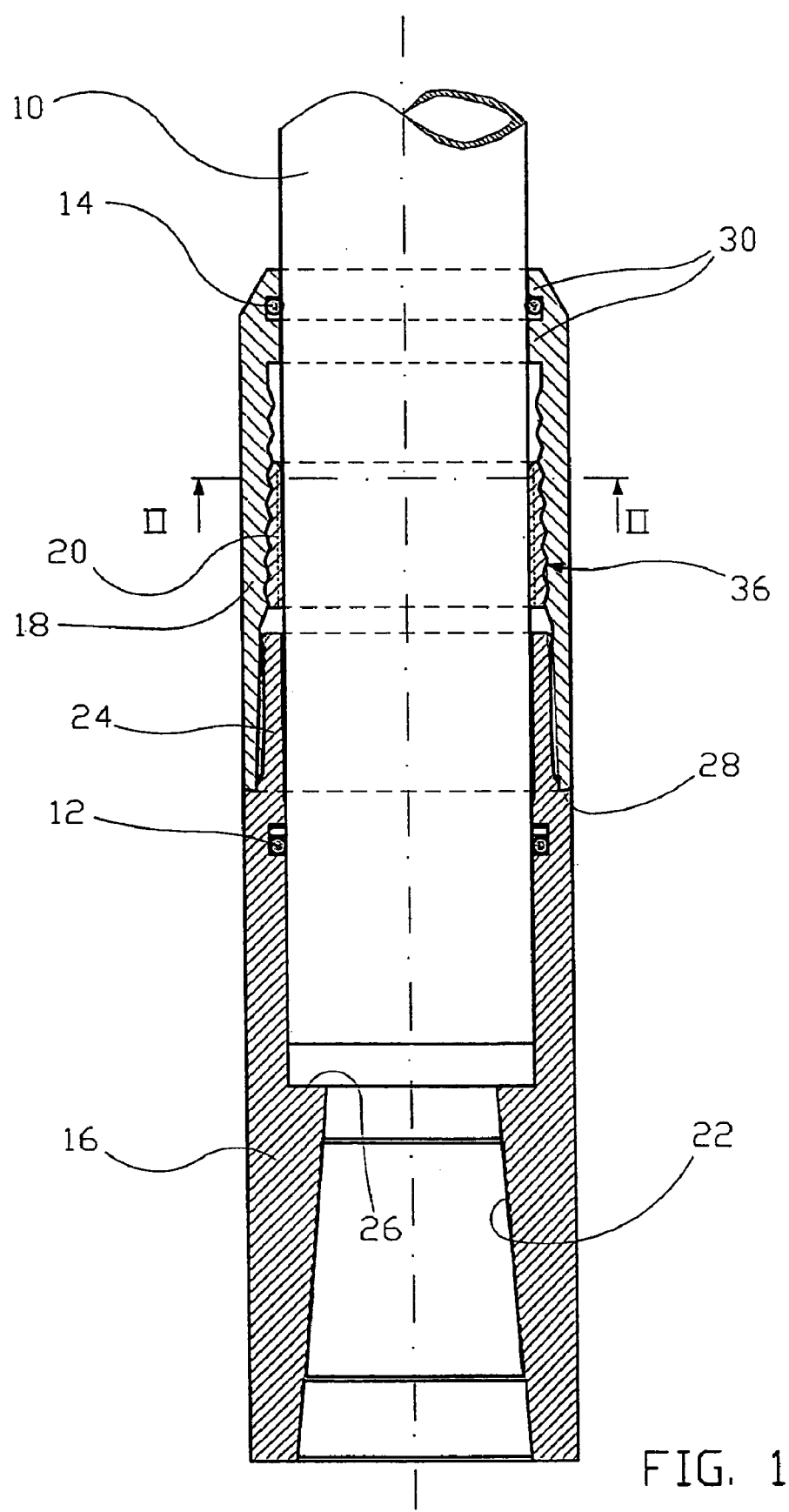
FIG. 1 shows an axial section through a connector according to the invention with the end portion of coiled tubing secured therein.

Reference will now be made to the drawings wherein like numerals refer to like parts throughout. FIG. 1 illustrates a connector for the connection of the end portion of a pipe, a pipeline, a pipe string or coiled tubing 10 comprises (besides the seals 12 and 14 in the form of O-rings positioned in internal circumferential grooves in the connector parts 16 and 18, which can be screwed together) three parts 16, 18 and 20 that can be screwed together.

A first part included in the connector has the form of an end piece 16 with an internally threaded conical bore 22 for the connection of downhole equipment/tools and a connecting socket 24 for the coiled tubing. The connecting socket 24 is externally conical and provided with external threads. Internally the socket 24 is cylindrical, so that the pipe wall is narrowing towards its free end.

The end piece 16 has a first, internal annular shoulder surface 26, which forms an abutment surface for the end surface of the coiled tubing 10. In an axial distance from this internal, annular abutment surface 26 the externally conical threaded socket-like connecting element 24 is defined by an, axially seen, annular shoulder surface 28 determining the depth of entering/screwing of the connecting element 24 into an outer adapter and connector sleeve 18 forming the second part of the connector.

The second part of the connector, in the form of an outer adapter and connector sleeve 18, is formed by an adapter sleeve element of an internally conical shape with an externally straight cylindrical jacket surface, so that the sleeve wall decreases successively in thickness towards the end which is directed towards the end piece 16, whereby the threaded internal wall defining the bore through the outer adapter and connector sleeve 18, decreases in diameter in the direction away from the end piece 16. At that end, which is positioned at the largest distance from the end piece 16, the outer adapter and connector sleeve 18 is formed with an inward annular flange 30, whose diameter mainly corresponds to the outer diameter of the coiled tubing 10.

Internally in this annular flange end portion is formed an annular circumferential groove which accommodates a first seal in the form of an O-ring 14. At a certain axial distance from the seal 14 and internally in the end piece 16 is formed a circumferential groove for a second seal in the form of an O-ring 12.

Figure 2:
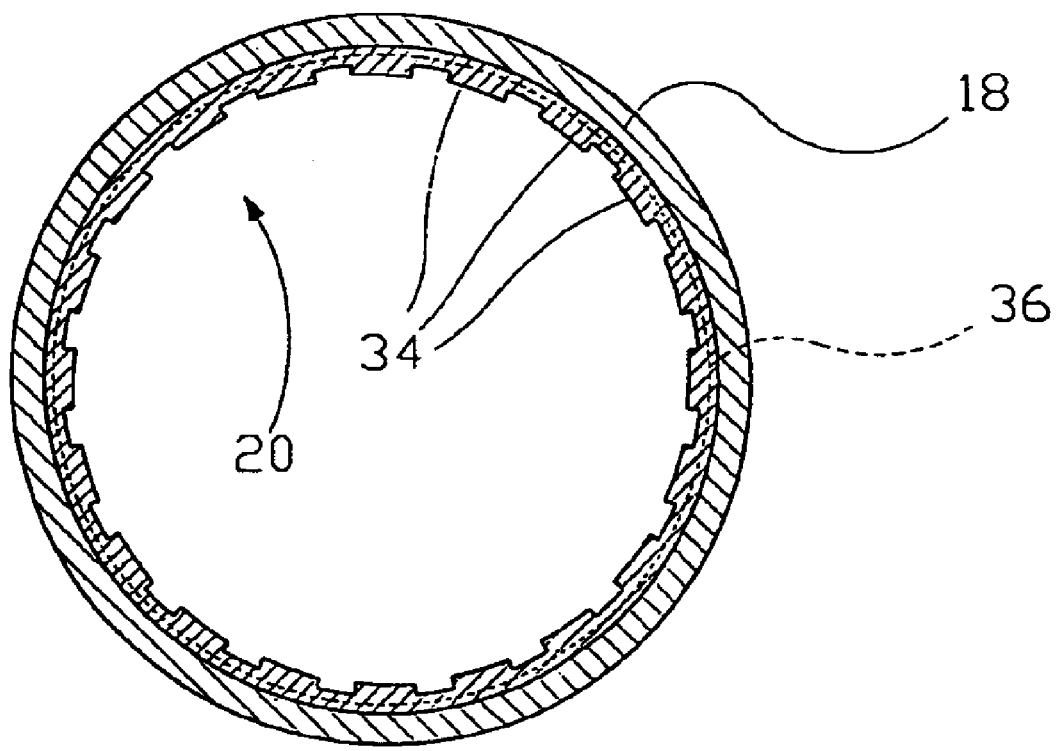
FIG. 2 shows a cross-section through an inner and an outer adapter sleeve in the screwed-together position, corresponding to the established connection according to the sectional plane II—II of FIG. 1.

The third part of the connector is formed by an inner externally conical and threaded adapter sleeve 20, which is shown in perspective in FIG. 3, in cross-section in FIG. 2 and in longitudinal section in FIG. 1.

This internal externally conical adapter sleeve 20 (internally exhibiting a straight cylindrical inner wall surface defining a bore) has a sleeve wall narrowing in the direction away from the end piece 16.

The conicity and threading of the inner adapter sleeve 20 complementarily corresponds to the conicity and threading of the outer adapter and connector sleeve 18. The same applies to the conicity and threading of the socket-like connecting element 24.

The inner adapter sleeve 20 preferably has external left-hand threads and may internally be formed—as a kind of ribs or other friction-creating/displacement-resisting projections opposite the surface of the coiled tubing 10—with (right-hand) threads 34 which will efficiently resist sliding of the inner adapter sleeve 20 on the coiled tubing 10 on rotation/displacement (in FIG. 2 the coiled tubing 10 has been left out for clarity). Here, cooperating threads on the outer and inner sleeves 18, 20 are identified by the common reference number 36.

The inner adapter sleeve 20 has a through slot 38, which will, together with specially selected spring steel or similar, make the adapter sleeve 20 shrinkable in the transversal direction when radial/transversal compressive forces are applied thereto by the outer sleeve 18 as a consequence of relative displacing movement of conical surfaces bearing on one another.

By the connection of the end portion of the coiled tubing 10, i.e. the outer portion which can be accommodated in the axial direction in the connector, the end surface of the coiled tubing 10 is abutting the axially innermost annular abutment surface 26.

To form a connection using the connector described above, the outer adapter and connector sleeve 18 is first passed over the coiled tubing 10 from the free end thereof, until this outer sleeve 18 adopts a position along the coiled tubing 10, in which its left-hand end of a minimal sleeve wall thickness is positioned at an axial distance from the outer free end of the connecting socket 24, said distance exceeding the axial length of the inner adapter sleeve 20.

Then the inner split, radially shrinkable adapter sleeve 20 is pushed and is brought to an initial position with its left-hand end of a maximum inner adapter sleeve thickness at a suitable position (experience will reveal how much this inner adapter sleeve can be expected to be moved axially by the displacing movement of the outer adapter sleeve towards the left during the engagement and displacement of its conical internal threads with/along the cooperating conical external threads of the inner adapter sleeve 20), whereas the constantly decreasing diameter of the bore of the outer sleeve effects a radial compression, transversal "shrinkage", of the inner adapter sleeve, whose compressive forces ensure the securing of the surrounding annular portion of coiled tubing.

It is assumed that the inner adapter sleeve 20 is firmly connected and secured in a position, in which its left-hand end, according to FIG. 1, is positioned at an axial distance from the left-hand end of the outer adapter and connector sleeve 18, said distance exceeding the effective axial length of the connecting socket 24, so that said connecting socket 24 may now be screwed into the free (without the inner adapter sleeve 20 positioned radially within) end portion, until the free end surface of the connecting socket 24 abuts, in a movement-stopping manner, the, axially seen, outer annular abutment surface 28 of the end piece 16 limiting the depth of entering/screwing of the externally conical threaded connecting socket 24. Thereby the connection is established.

Although the foregoing description of the preferred embodiments of the invention has shown, described and pointed out the fundamental novel features of the invention, it will be understood that various omissions, substitutions and changes in the form of the detail of the apparatus as illustrated, as well as the uses thereof, may be made by those skilled in the art without departing from the spirit of the present invention. Consequently, the scope of the invention should not be limited to the foregoing discussion, but should be defined by the appended claims.

What is claimed is:

1. A connector for connecting the end portion of a pipe, a pipeline, a pipe string or coiled tubing, wherein the connector is formed or provided with at least one connecting device for equipment/tools, the said connector comprising parts that can be screwed together and have aligned bores for the accommodation of said pipe end portion, which is to be secured in the connector in the screwed-together condition of the parts, said connector further comprising a radially inner transversally shrinkable adapter sleeve, which is to bear, in a connected position, at its inner circumferential surface in a clamping manner against the outer jacket surface of the pipe end portion, characterized in that the adapter sleeve exhibits an external, conically extending threaded jacket surface, which cooperates with a surrounding outer adapter and connector sleeve with an internal, conically extending threaded circumferential surface, said outer adapter and connector sleeve having a second internal threaded surface, spaced in a direction along the longitudinal axis of the pipe end portion from said internal conically extending threaded circumferential surface, and cooperating with a threaded jacket portion of a socket-like connecting element formed on an end piece of the connecting device, wherein at the end located the farthest from said end piece with the socket-like connecting element, the outer adapter and connector sleeve is formed with an inward annular flange defining a sleeve bore section of a diameter generally corresponding to the outer diameter of the pipe.

2. The connector of claim 1, wherein the outer adapter and connector sleeve has an axial length that is at least twice an axial length of the inner adapter sleeve, whose length essentially corresponds to the depth of entering/screwing of the socket-like connecting element into the outer adapter and connector sleeve, characterized in that the inner sleeve and the socket-like connecting element of the end piece both have substantially straight cylindrical bores, whereas the outer adapter and connector sleeve has a substantially straight cylindrical outer jacket, wherein tapers in wall thicknesses of the inner sleeve, the outer adapter and connector sleeve and the socket-like connecting element provide conical surfaces and mating conical surfaces such that when the conical surfaces connect a total wall thickness is essentially uniform.

3. The connector of claim 1, wherein the end piece is adapted to receive downhole equipment at the end substantially opposite from the socket-like connecting element.

4. The connector of claim 1, wherein the external threads of the inner adapter sleeve is left-handed.

5. The connector of claim 4, wherein the internal surface of the inner adapter sleeve comprises threads that bite into the surface of the pipe to resist displacement of the inner adapter sleeve relative to the pipe.

6. The connector of claim 5, wherein the threads of the internal surface of the inner adapter sleeve is right-handed.

7. The connector of claim 4, wherein the external threads of the inner adapter sleeve transfers external torque on the connector so as to further tighten around the pipe so as to resist circumferential displacement of the inner adapter sleeve relative to the pipe.

8. An assembly for connecting to an end of a tubular, comprising:
   an inner sleeve having a tapered threaded outer surface;
   a coupling member having a tapered threaded inner surface, wherein the inner surface of the coupling member cooperatively engages the outer surface of the inner sleeve; and
   a connecting member having a tapered threaded end portion for cooperatively engaging the inner surface of the coupling member and a connector portion for coupling to a downhole tool, wherein the coupling member is formed with an inward annular flange defining a coupling bore with a diameter generally corresponding to the outside diameter of the tubular.

9. The assembly of claim 8, wherein the connector portion is substantially opposite the tapered threaded end portion of the connecting member.

10. The assembly of claim 8, wherein the tapered threaded outer surface of the inner sleeve is left-handed.

11. The assembly of claim 10, wherein the tapered threaded outer surface of the inner sleeve transfers external torque on the assembly so as to further tighten around the tubular so as to resist circumferential displacement of the inner sleeve relative to the tubular.

12. The assembly of claim 8, wherein the internal surface of the inner sleeve comprises formations that bite into the surface of the tubular to resist displacement of the inner sleeve relative to the tubular.

13. The assembly of claim 12, wherein the formations are threads on the internal surface of the inner sleeve.

14. The assembly of claim 13, wherein the threads on the internal surface of the inner sleeve are right-handed and the tapered threaded outer surface of the inner sleeve is left-handed.

15. The assembly of claim 8, wherein the inner sleeve and at least the tapered threaded end portion of the connecting member have a substantially straight assembly has a substantially straight cylindrical outer surface.

16. The assembly of claim 8, further comprising a first seal disposed in the coupling bore and a second seal disposed along the inside surface of the connecting member.

17. A method establishing the connection and securing of a pipe end portion to a connector that comprises an elongate adapter sleeve, an inner shrinkable adapter sleeve, and an end piece that includes a socket-like connecting element, wherein the elongate adapter sleeve comprises an inner surface extending longitudinally conical so as to define a sleeve bore and wherein the sleeve bore is provided with threads, wherein the inner shrinkable adapter sleeve comprises a threaded jacket surface of an externally conical extent adapted to be received by the threaded sleeve bore and wherein the inner surface of the inner shrinkable adapter sleeve is dimensioned to fit over the end portion of the pipe, wherein the end piece comprises an externally threaded conically extending socket-like element adapted to be received by a second internally threaded bore wall portion of the elongate adapter sleeve wherein the end piece further comprises an annular stop surface dimensioned to engage the larger diameter bore end of the elongate adapter sleeve, the method comprising:

positioning the elongate adapter sleeve over the end portion of the pipe in a longitudinal manner;

positioning the inner shrinkable adapter sleeve over the end portion of the pipe;

engaging the threaded jacket surface of the inner shrinkable adapter sleeve with the threaded sleeve bore wherein resulting screwing action compresses the inner adapter sleeve gradually during the relative displacement of their cooperating conical surfaces in the longitudinal direction of the connector until the second threaded bore wall portion of the elongate adapter sleeve projects axially beyond the nearest end of the shrunk inner sleeve; and engaging, the conically extending socket-like connecting element of the end piece into the second internally threaded bore wall portion of the elongate adapter sleeve until the free end of the elongate adapter sleeve abuts the annular stop surface.

18. A method for securing a tubular end portion to a connector, comprising:

providing the connector having an inner sleeve, a coupling member, and a connecting member;

positioning the coupling member over the tubular end portion in a longitudinal manner;

positioning the inner sleeve over the end portion of the tubular end portion;

engaging a tapered external threaded surface of the inner sleeve with a tapered internal threaded bore of the coupling member, wherein the engaging compresses the inner sleeve and longitudinally displaces the inner sleeve relative to the coupling member until a second tapered internally threaded bore of the coupling member projects axially beyond the inner sleeve; and engaging the connecting member into the tapered internal threaded bore of the coupling member until an end of the coupling member abuts an annular stop surface of the connecting member.

* * * * *